US005848724A

United States Patent [19]

Uzzle et al.

[11] Patent Number: 5,848,724

[45] Date of Patent: Dec. 15, 1998

[54] ANTI-BRIDGING DEVICE FOR VENDING MACHINES

[75] Inventors: Thomas E. Uzzle, Manchester; Joel D. Wiesner, Maryland Heights, both of Mo.

[73] Assignee: Coin Acceptors, Inc., St. Louis, Mo.

[21] Appl. No.: 691,544

[22] Filed: Aug. 2, 1996

[51] Int. Cl.[6] .................... B65G 59/00

[52] U.S. Cl. .................... 221/67; 221/312 R

[58] Field of Search .................... 221/67, 312 R, 221/241, 242, 197, 92; 211/59.2

[56] References Cited

U.S. PATENT DOCUMENTS 3,547,312 12/1970 Ambiose .................... 221/67

4,986,615 1/1991 Hieb et al. .................... 221/67

*Primary Examiner*—Kenneth Noland

*Attorney, Agent, or Firm*—Cohn, Powell & Hind

[57] ABSTRACT

This anti-bridging system for vending machine storage compartments having a relatively tapered walls leading to an exit, includes a relatively narrow elongate member attached to one of the walls and arranged to tilt the longitudinal axis of a container in the vicinity of the baffle area out of parallel relative to the baffle and also relative to the axes of adjacent containers. This arrangement facilitates the downward travel of the containers toward the exit.

12 Claims, 7 Drawing Sheets

Fig. 4
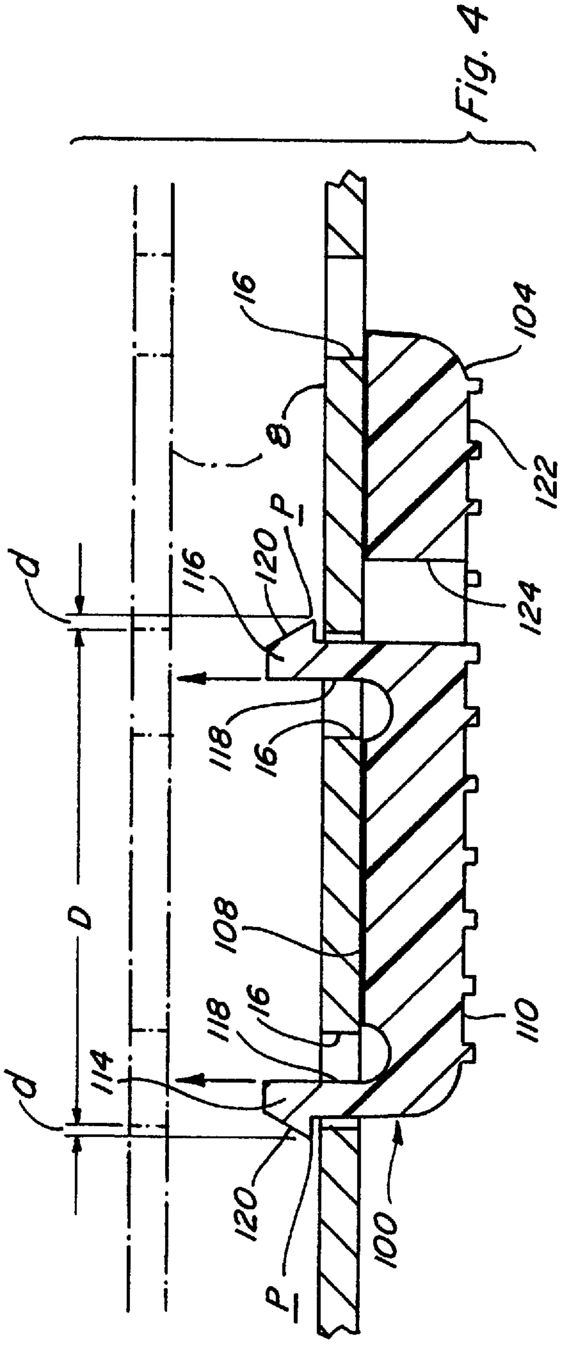
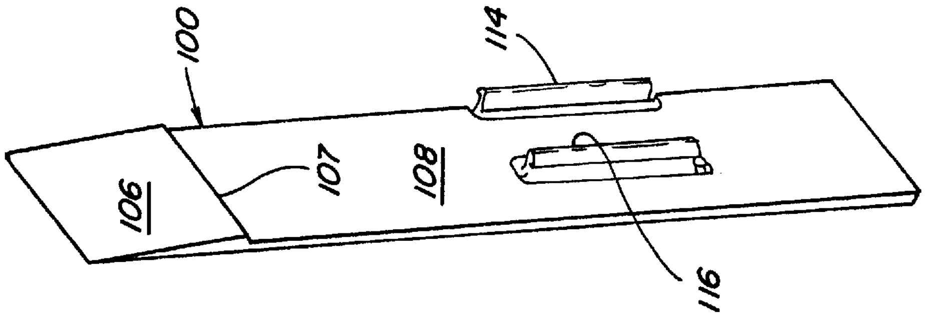
Fig. 3

ANTI-BRIDGING DEVICE FOR VENDING MACHINES

BACKGROUND OF THE INVENTION

This invention relates generally to the bridging in vending machine packages and particular to the provision of a device for relative adjustment of the orientation of the packages to counter the bridging effect.

The bridging of packages such as straight wall cans and bottles occurs when the packages are prevented from sliding relative to one another when the storage column narrows in the baffle area prior to exit and tend rather to adhere to each other. There are several reasons why the phenomenon of bridging occurs between straight wall packages when the packages are prevented from sliding against each other. For example, bridging/sticking tends to occur when the ink on the package labels causes the packages to stick against each other and inhibits sliding of the contact surfaces. It may also occur when the package label sits above the surface of the package, rather than being relatively recessed, thereby resulting in label to label contact between packages. The cylindrical geometry of, for example, a 20 ounce straight wall package allows the packages to stack in line contact with each other along their entire length thereby promoting adhesion between the packages. Also, the high mutual adhesion of straight wall packages tends to result in a "gearing" action as opposed to a sliding action, as the packages travel down the column. Such "gearing" creates a bridging action when the packages are under a column load and a triangular "nesting" of packages occurs such that each package is in contact with the two packages below. The "nesting" inhibits the "gearing" because two of the three nested packages are always trying to rotate against each other. "Nesting" occurs primarily in the baffle area where the narrow column width can accommodate a "nesting" geometry. In addition to the mutual action of the packages a problem also occurs due to high frictional contact between a flush package label and the baffle resisting package movement through the baffle area.

Anti-bridging methods are disclosed in several patents. For example, U.S. Pat. No. 4,940,116 discloses a ramp apparatus which is disposed on one storage compartment wall and extends substantially the full depth of a container compartment. The ramp has an inclined upper edge arranged so as not to contact a substantial portion of a container passing over said edge to inhibit bridging. U.S. Pat. No. 4,986,615 discloses a vending compartment which includes a pair of spaced ribs disposed on one storage compartment wall, the ribs being of uneven thickness to engage a contoured bottle container to maintain a parallel longitudinal axis and reduce the surface area in contact on a contoured container and being intended to inhibit bridging. U.S. Pat. No. 3,026,002 discloses a relatively wide spacer plate mounted on each of opposed storage compartment walls having a thicker upper portion and a thinner lower portion intended to move containers in parallel relation toward and away from each other as they proceed toward a swing gate disposed in the exit area and the spacer plates are intended to prevent jamming of the containers. These prior art devices are relatively complicated and consequently tend to be expensive.

The present anti-bridging device solves these and other problems in a manner not revealed in the known prior art.

SUMMARY OF THE INVENTION

This anti-bridging device provides a means of avoiding in line contact between the packages by skewing the packages which are in contact with the baffle so that the longitudinal axes of adjacent packages are no longer parallel. This arrangement inhibits bridging because the surface contact between the packages is point-to-point rather than line-to-line tending to substantially eliminate a "gearing" effect of the packages in the baffle area and promote sliding between the packages.

The use of a relatively narrow member attached to the inclined wall, which provides the baffle, moves adjacent packages out of parallel and prevents the occurrence of a "nesting" geometry. This member provides a localized shim effect and tilts the packages so that a surface label avoids line contact between the package and the baffle and between adjacent containers thereby decreasing contact friction. The use of a textured low friction coefficient, high density plastic clip for the member promotes sliding of the packages along the baffle.

This anti-bridging device is for a vending machine storage compartment having opposed sidewalls tapered to direct packages having parallel longitudinal axes into an exit opening. The device comprises tilting means attached to one of the wall surfaces for tilting the longitudinal axis of at least one package relative to a wall surface and relative to the longitudinal axis of at least one other package to reduce frictional engagement between said packages and facilitate travel of the packages toward said exit opening.

It is an aspect of the invention to provide that the storage compartment, the system includes a first compartment wall; a second compartment wall having an upper portion, generally parallel with the first compartment wall, and a lower portion inclined relative to said first compartment wall and providing a baffle; said lower wall portion cooperating with said first compartment wall to define a progressively narrowing compartment exit; and the tilting means is disposed on said lower portion of said second wall for tilting at least one package traveling down the inclined wall portion relative to another package engaging said one package.

It is another aspect of the invention to provide that the tilting means includes a relatively narrow portion relatively raised from a surface of said second wall lower portion having a width less than an engaged cylindrical portion of said package.

It is another aspect of the invention to provide that said tilting means includes an elongate member having a width less than an engaged cylindrical portion of said package and a thickness raised from a surface of said second wall lower portion.

It is another aspect of the invention to provide that said elongate member has a upper portion and a lower portion, said lower portion being attached to said lower wall portion and said upper portion providing a transition between said upper and lower wall portions.

It is yet another aspect of the invention to provide that said elongate member includes an inner surface engageable with said second wall and a textured outer surface engaging said package.

It is still another aspect of the invention to provide that said second wall portion includes an upper wall portion and lower wall portion having a plurality of slots, and said elongate member includes a lower wall portion having resilient means removably snap-fittable into selected slots.

It is another aspect of the invention to provide that said inclined lower wall portion includes at least a pair of slots, and said lower portion of said elongate member includes associated inwardly projecting resilient means snap-fittable into selected slots.

It is an aspect of the invention to provide that said second wall upper portion includes an abutment means, and said elongate member upper portion includes a shoulder means disposed adjacent said abutment means.

It is still another aspect of the invention to provide that said walls are of metal and said elongate member is of plastic having a textured surface engageable by said packages to provide a reduced coefficient of friction between the packages and the member.

This anti-bridging device is inexpensive and easy to use and is very effective for its intended purpose. dr

BRIEF DESCRIPTION OF THE DRAWINGS

FIG. 3 is a rear view of the anti-bridging device;

FIG. 4 is an enlarged cross-sectional view taken on line 4—4 of FIG. 2;

DESCRIPTION OF THE PREFERRED EMBODIMENT

Figure 1:
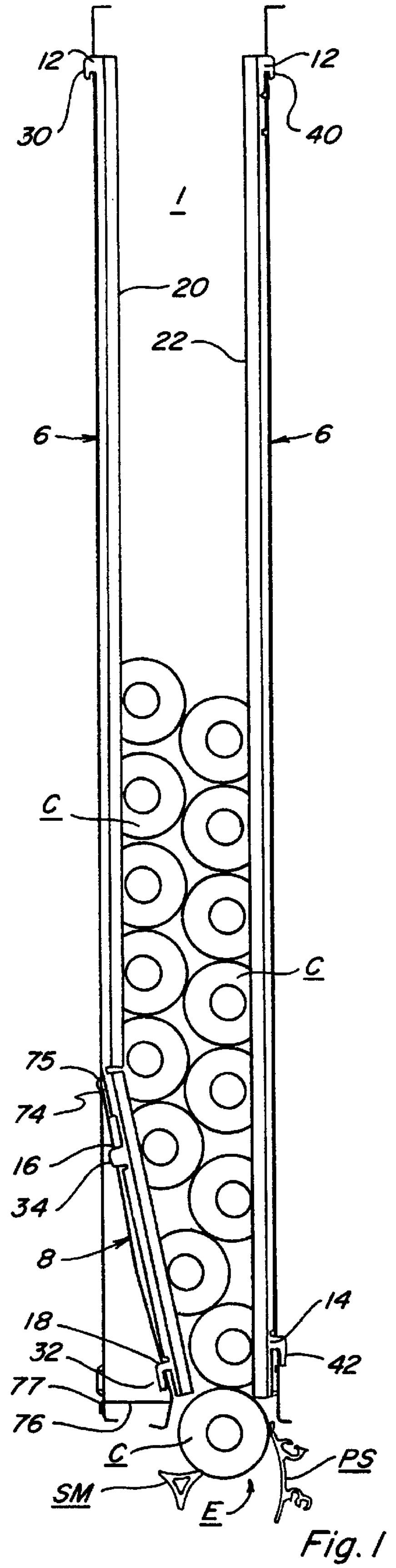
FIG. 1 is a cross sectional view through a vending machine storage compartment column.

Referring now by reference numerals to the drawings and first to FIG. 1, it will be understood that a vending machine storage compartment 1 is defined by opposed vertical compartment walls 6 having an auxiliary, lower inclined compartment wall 8, which is hooked to one side of each vertical compartment wall 6 and provides a baffle. The inclined compartment wall 8 includes a pair of hooked portions 74 at its upper end which are received within slots 75 provided in the vertical wall 6. In addition, the inclined compartment wall 8 includes a pair of foot portions 76, which are received within slots 77 in the vertical wall 6. This structural arrangement of parts provides a means by which the inclined baffle 8 is connected to the vertical wall 6 and serves to progressively narrow the compartment leading to the exit E. As shown in FIG. 1, the packages, such as beverage containers C, are stacked in the storage compartment 1 in staggered rows and by virtue of the baffle 8 are formed into a single line. Exiting containers may be dispensed by a dispensing mechanism, which includes product support members SM and adjustable product stops PS, as shown and described in U.S. Pat. Nos. 5,511,688 and 5,529,207 which are incorporated herein by reference. The dispensing mechanism may be actuated by reciprocating mechanism (not shown) such as that shown in U.S. Pat. Nos. 4,991,739 and 4,991,740, which are also incorporated herein by reference.

Spaced, ell-shaped, hooked retainers 20 and 22 are provided to retain the package containers C in place. Retainers 20 and 22 conform generally to the inside face of the left hand wall 6, 8 and the inside configuration of the right hand wall 6 respectively. The retainers 20 and 22 are hook connected to slots. At the upper and lower ends retainer 20 includes hooks 30 and 32 are received by slots 12 and 18, respectively. Retainer 22 includes hooks 40 and 42 received by slots 12 and 14 respectively. In addition, retainer 20 includes intermediate tabs 34 received by slots 16. A vending machine compartment of this character is disclosed in U.S. Pat. No. 5,529,207, which is incorporated herein by reference. However, the retainers 20 and 22 form no part of the present invention except that the slots 16, which receive the retainer lugs 34, serve also as a means of attachment for the anti-bridging clips 100 as will now be described by reference to FIGS. 2–4 in particular.

The anti-bridging clip 100 provides a relatively raised surface on the face of lower compartment wall or baffle 8 which serves to engage the packages as they move toward the exit E and skew them so that they tend to move out of parallel with the baffle 8 and the other packages to facilitate the travel of the packages as they move toward the compartment exit. The effect of the clips 100 will be described later after describing the clips 100.

The anti-bridging clips 100 each include an upper portion 102 and a lower portion 104. As shown in FIG. 3, the upper portion includes a flat inner face 106 and the lower portion 104 includes a flat inner face 108. The two faces 106 and 108 are inclined at the same angle as the inner faces of the compartment walls 6 and 8 so that when the clip 100 is installed the faces 106 and 108 lay flat against the inner faces of the compartment walls 6 and 8. In addition, the face 108 is recessed relative to the inclined face 106 to define a shoulder 107, which is engageable with the upper margin 112 of the baffle 8, which defines an abutment. As best shown in FIGS. 3 and 4, the clip lower portion 104 is formed into a pair of outstanding prongs 114 and 116 which are sized shorter in length than the slots 16. The prongs 114 and 116 are disposed in mirror image of each other and include a stem portion 118 and a head portion 120. A channel portion 122 is disposed adjacent each stem 118 to effectively lengthen and thereby increase the resilience of said stems. The head of each prong 114, 116 includes a triangular portion having a point indicated by P. The distance between the prong points P is sufficiently greater than maximum distance D between the slots so that when the prong heads 120 are urged into the slots 16 there is a resulting disposition of the heads, due to the snap-fit relationship, to maintain an average overhang d, the average overhang d being sufficient to retain the clips 100 in place. Also, the distance between the inner face 108 and the point P is only slightly greater than the thickness of the baffle plate 8 so as to hold the clip 100 securely in place. It will be understood that the inclined face of the head 120 provides a camming action flexing the prongs toward each other and facilitating entry into the slots 16. In the embodiment shown, the clip 100 is molded from plastic material such as high density polyethylene or polypropylene and, in the embodiment shown the prongs 116 and 118 are spaced apart to suit the spacing of the slots 16 into which they are received. In the embodiment shown, there is a portion of the clip 100, indicated by numeral 122 which extends beyond the prong 116. In order to facilitate the molding process, and provide the prongs 114 and 116 with similar resilience, a slot 124 is provided adjacent prong

Figure 2:
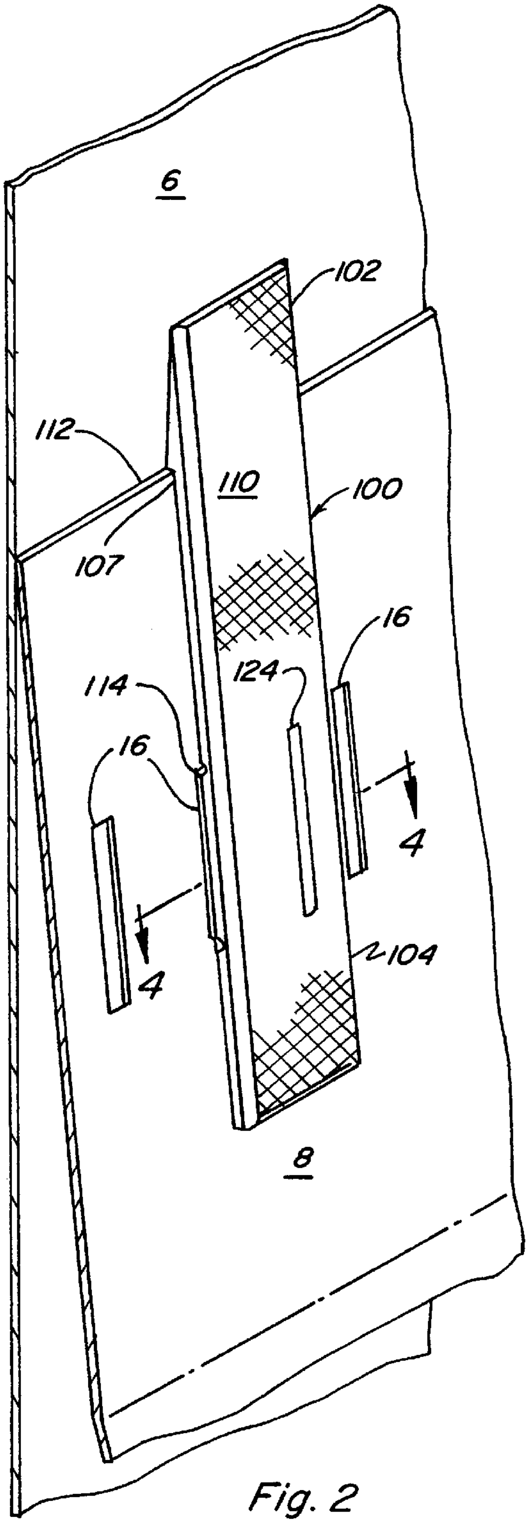
FIG. 2 is a fragmentary perspective view of a lower wall portion of the compartment showing the anti-bridging device in place.

116. The walls 6 and 8 may be of galvanized metal. In the preferred embodiment, the outer face 110 of the clip 100, which is engaged by the packages is textured as shown in FIGS. 2 and 4 to reduce the coefficient of friction by reducing the surface area in contact with the packages. However, the clip 100 will also function with a relatively smooth outer surface.

It is believed that the structural arrangement of parts of the clip 100 and the baffle plate 8 will be readily understood from the above description but for completeness of disclosure the function of the clip will be briefly described with reference to FIGS. 5-10.

Figure 8:
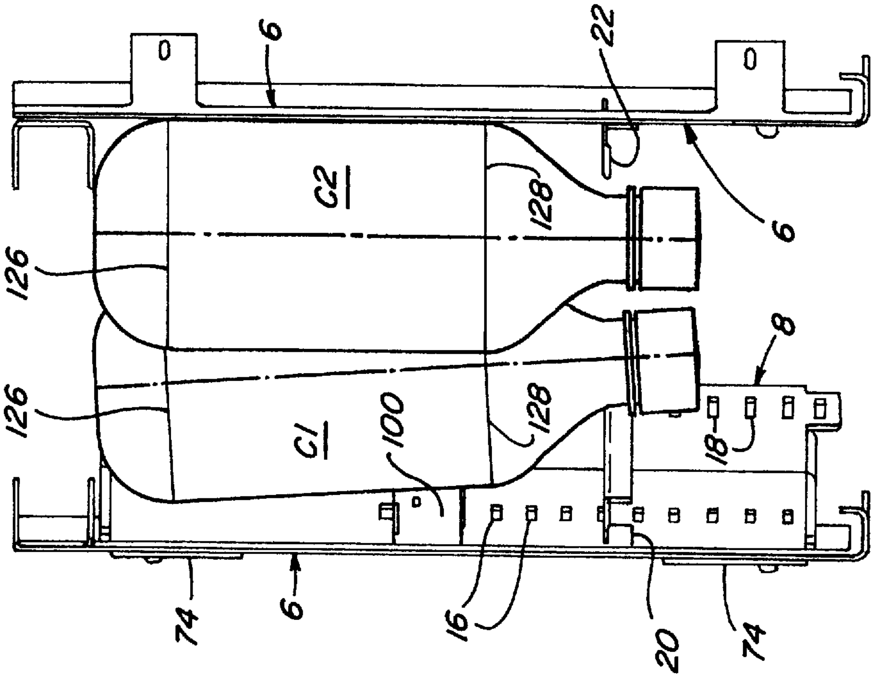
FIG. 8 is a similar view to FIG. 7 showing the disposition of the lower two packages when the anti-bridging device is used.

The clips 100 are installed, in the embodiment shown, by virtue of the snap-fit relationship between the prongs 114 and 116, by simply pushing associated prongs into a selected pair of slots 16. The selection of the slots locates the clips and the location is determined by the length of the straight, cylindrical portion of the package which, in the embodiment shown, is indicated by circumferential margins 126 and 128 on containers C1, C2, C3, etc. In the case of a 20 ounce beverage container each clip 100 is preferably arranged, as shown in FIG. 8, adjacent the end of the intermediate cylindrical portion of the container defined by margin 128. The clip 100 is removable and replaceable in a different set of slots to suit another size of container.

Figure 5:
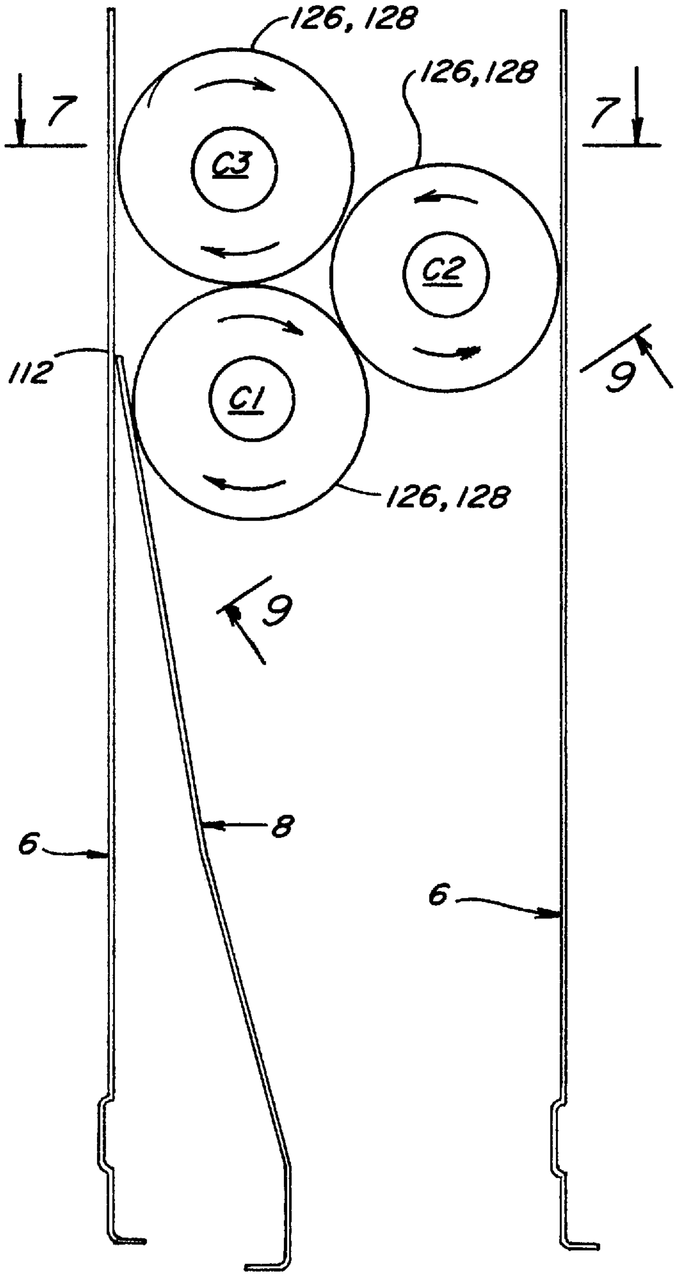
FIG. 5 is a schematic view showing the disposition of packages when the anti-bridging device is not used.
Figure 7:
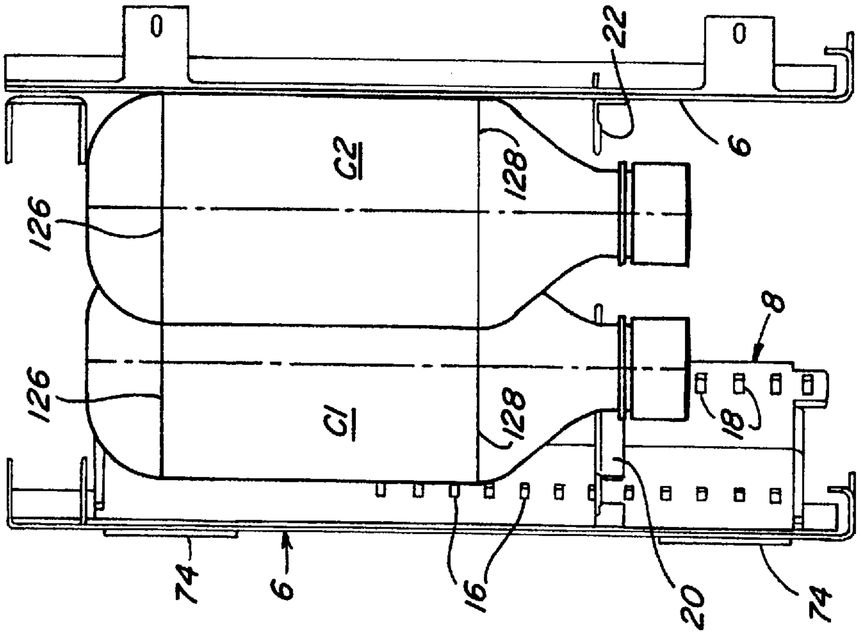
FIG. 7 is a top plan view taken on line 7—7 of FIG. 5 showing the disposition of the lower two packages when the anti-bridging device is not used.
Figure 9:
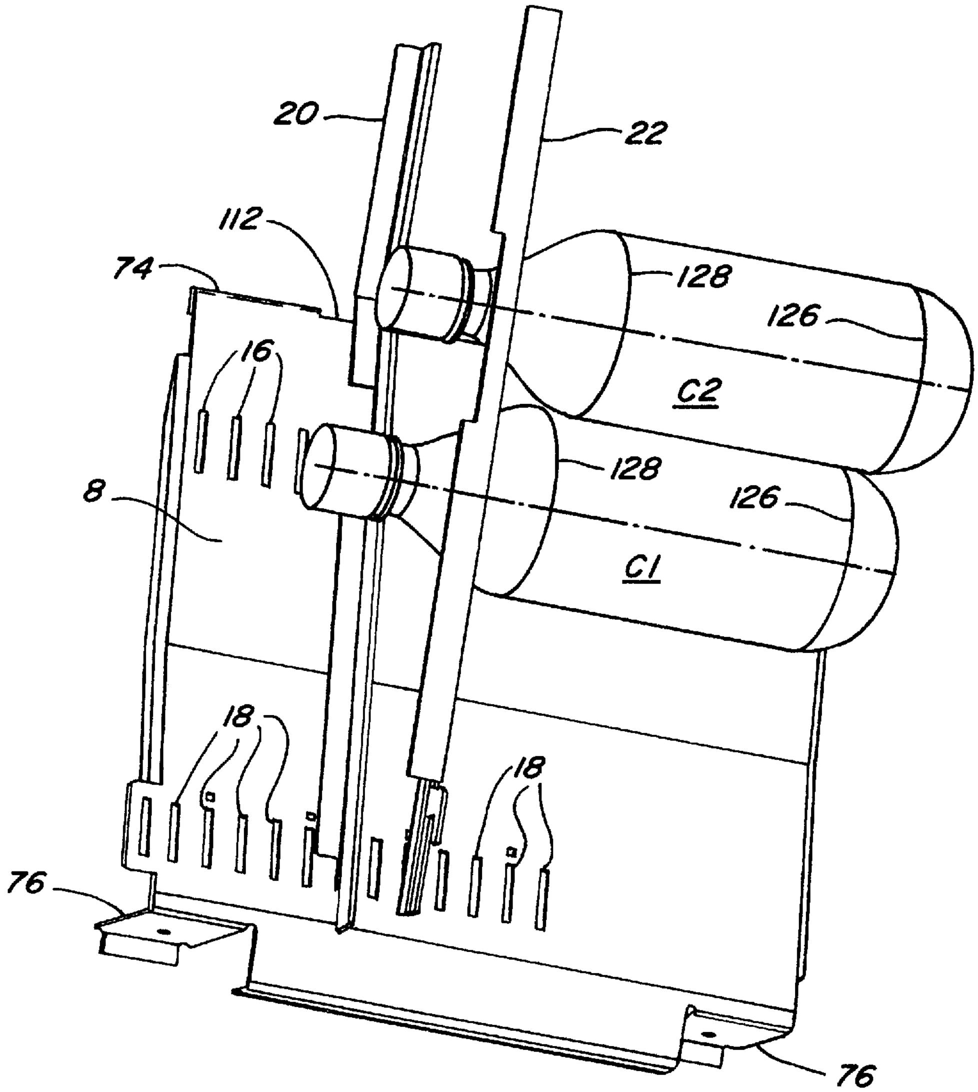
FIG. 9 is a perspective view of the lower, baffle portion of the compartment wall taken on line 9—9 of FIG. 5, showing the disposition of the lower two packages when the anti-bridging device is not used.

When no clip 100 is provided, as shown in FIGS. 5, 7 and 9, the longitudinal axes of the containers C1, C2, C3, etc. are parallel to the walls 6 and 8 and to each other. When there is nesting in the area of the baffle, as shown in FIG. 5, containers C1 and C2 tend to move clockwise and counterclockwise, respectively, during downward movement. Containers C2 and C3 tend to move counterclockwise and clockwise, respectively, but containers C1 and C3 both tend to move clockwise, i.e., to slide upon each other in line engagement. This frictional relationship causes binding or jamming, particularly in the area of the baffle, which is highly undesirable.

Figure 6:
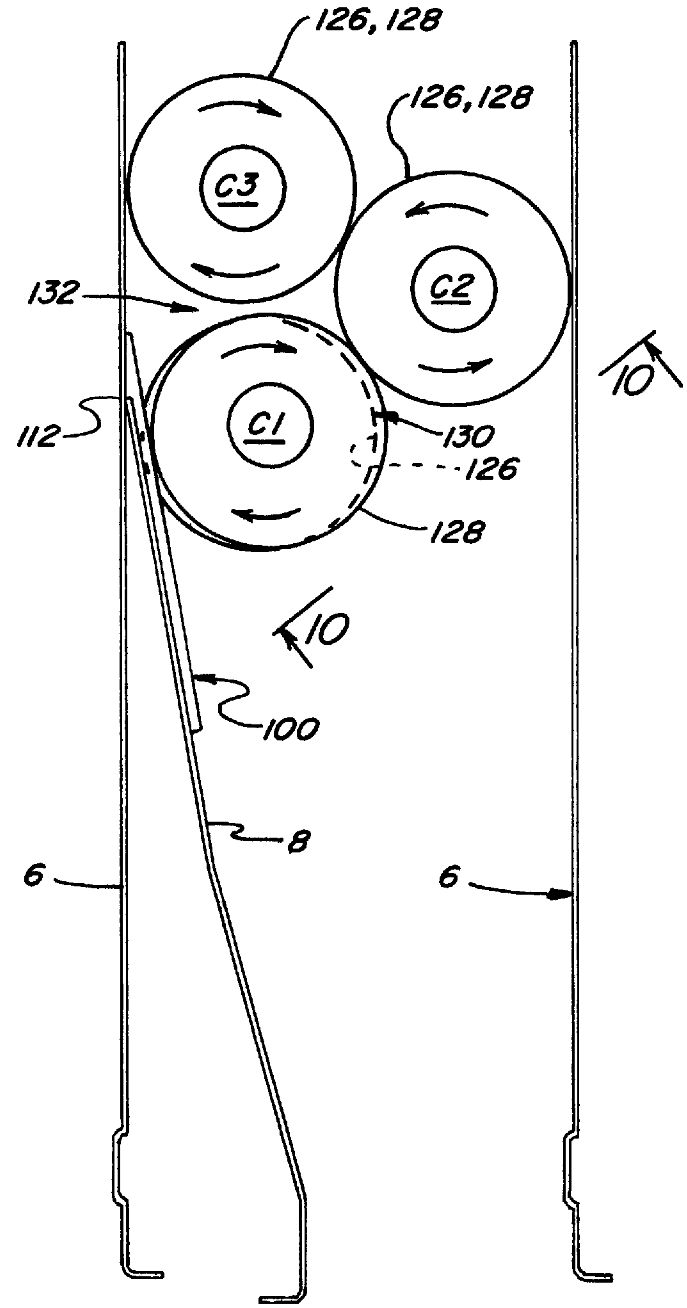
FIG. 6 is a similar view to FIG. 5 showing the disposition of packages when the anti-bridging device is used.
Figure 10:
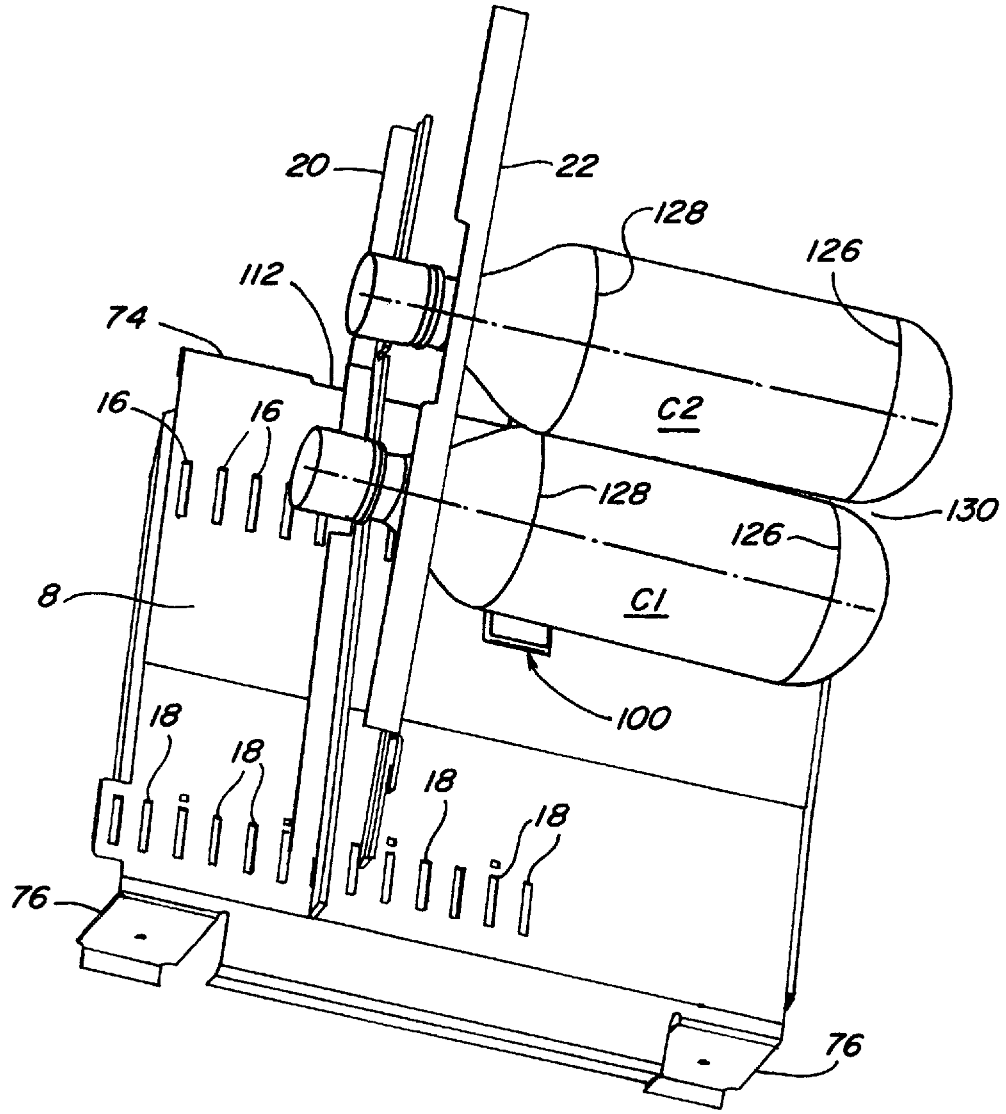
FIG. 10 is a similar view to FIG. 9 taken on line 10—10 of FIG. 6, showing the lower two packages when the anti-bridging device is used.

However, when a tilting means such as the clip 100 is provided, as shown in FIGS. 6, 8 and 10 the result is that the axis of container C1 is tilted out of parallel relative to the walls 6 and 8, and also relative to the axes of containers C2 and C3, as shown in FIG. 8, when container C1 moves over the surface of the elongate clip 100. Because of this relative disposition of the container C1 longitudinal axis, there is diametrical displacement of the front circumferential margin 128 relative to the rear circumferential margin 126. The result is that there is a gap along most of the length of container C2, as shown by 130 in FIGS. 6 and 10 and, instead of line engagement between containers C1 and C2 there is, rather, a tendency to a point engagement which reduces friction between these relatively rotating containers. This tilting also occurs between container C1 and the baffle 8, as shown in FIG. 8. The provision of a single clip 100 in engagement with container C1, which tilts or skews this container relative to adjacent containers C2 and C3 and the baffle 8, considerably facilitates smooth downward passage of the containers. As best shown in FIG. 6, transverse displacement of container C1 by the clip 100, relative to the baffle 8 causes container C1 to exert a force on container C2 having an upward component. Container C2, in turn exerts a force on container C3. This force tends to separate container C3 from container C1, as shown by gap 132, taking container C3 out of engagement with container C1 for at least part of its length. The result of this disengagement is to reduce or eliminate the frictional resistance which would otherwise occur between containers C1 and C3 due to the rotational movement of these containers being in the same direction but the tangential movement between the upper surface of container C1 and the lower surface of container C2 being in opposite directions. Thus, rotation of containers C1 and C3 can occur substantially without opposition from each other thereby assisting in eliminating or substantially reducing the bridging effect.

In the embodiment shown, dispensing 20 ounce containers has been effectively accomplished with significantly reduced bridging by using a clip having a width of about one inch and a thickness of about one-eighth inch molded from high density plastic. In addition, the outer face 110 of the clip 100, which is engageable by the packages, may be textured or otherwise formed to reduce the coefficient of friction further lessen the adhesion between the clip and the package.

Although the invention has been described by making detailed reference to a preferred embodiment, such detail is to be understood in an instructive rather than in any restrictive sense, many other variants being possible within the scope of the claims hereunto appended.

We claim as our invention:

1. An anti-bridging system for packages in a vending machine storage compartment the system comprising:

(a) a first compartment wall;

(b) a second compartment wall having an upper portion, generally parallel with the first compartment wall, and a lower portion inclined relative to said first compartment wall; said lower wall portion cooperating with said first compartment wall to define a progressively narrowing compartment exit; and (c) tilting means on said lower portion of said second wall for tilting the longitudinal axis of at least one package traveling down the inclined wall portion relative to the longitudinal axis of at least another package engaging said one package.

2. An anti-bridging system as defined in claim 1, in which:

(d) the tilting means includes a relatively narrow portion relatively raised from a surface of said second wall lower portion having a width less than an engaged cylindrical portion of said package.

3. An anti-bridging system as defined in claim 1, in which:

(d) said tilting means includes an elongate member having a width less than an engaged cylindrical portion of said package and a thickness raised from a surface of said second wall lower portion.

4. An anti-bridging system as defined in claim 3, in which:

(e) said elongate member has a upper portion and a lower portion, said lower portion being attached to said lower wall portion and said upper portion providing a transition between said upper and lower wall portions.

5. An anti-bridging system as defined in claim 3, in which:

(e) said second wall portion includes an upper wall portion and lower wall portion having a plurality of slots, and (f) said elongate member includes a lower wall portion having resilient means removably snap-fittable into selected slots.

6. An anti-bridging system as defined in claim 3, in which:

(e) said inclined lower wall portion includes at least a pair of slots, and (f) said lower portion of said elongate member includes associated inwardly projecting resilient means snap-fittable into selected slots.

7. An anti-bridging system for packages in a vending machine storage compartment, the system comprising:

(a) a first compartment wall;

(b) a second compartment wall having an upper portion, generally parallel with the first compartment wall, and a lower portion inclined relative to said first compartment wall; said lower wall portion cooperating with said first compartment wall to define a progressively narrowing compartment exit;

(c) tilting means on said lower portion of said second wall for tilting the longitudinal axis of at least one package traveling down the inclined wall portion relative to the longitudinal axis of at least another package engaging said one package;

(d) said tilting means including an elongate member having a width less than an engaged cylindrical portion of said package and a thickness raised from a surface of said second wall lower portion; and (e) said elongate member including an inner surface engageable with said second wall and a textured outer surface engaging said package.

8. An anti-bridging system for packages in a vending machine storage compartment, the system comprising:

(a) a first compartment wall;

(b) second compartment wall having an upper portion, generally parallel with the first compartment wall, and a lower portion inclined relative to said first compartment wall; said lower wall portion cooperating with said first compartment wall to define a progressively narrowing compartment exit;

(c) tilting means on said lower portion of said second wall for tilting the longitudinal axis of at least one package traveling down the inclined wall portion relative to the longitudinal axis of at least another package engaging said one package;

(d) said tilting means including an elongate member having a width less than an engaged cylindrical portion of said package and a thickness raised from a surface of said second wall lower portion;

(e) said second wall upper portion including an abutment means; and (f) said elongate member upper portion including a shoulder means disposed adjacent said abutment means.

9. An anti-bridging system for packages in a vending machine storage compartment, the system comprising:

(a) a first compartment wall;

(b) a second compartment wall having an upper portion, generally parallel with the first compartment wall, and a lower portion inclined relative to said first compartment wall; said lower wall portion cooperating with said first compartment wall to define a progressively narrowing compartment exit;

(c) tilting means on said lower portion of said second wall for tilting the longitudinal axis of at least one package traveling down the inclined wall portion relative to the longitudinal axis of at least another package engaging said one package;

(d) said tilting means including an elongate member having a width less than an engaged cylindrical portion of said package and a thickness raised from a surface of said second wall lower portion; and (e) said walls being of metal and said elongate member being of plastic having a textured surface engageable by said packages to reduce friction.

10. In a vending machine storage compartment having opposed sidewalls relatively tapered to direct packages having longitudinal axes into an exit opening, an anti-bridging device comprising:

(a) tilting means attached to one of the wall surfaces for tilting the longitudinal axis of at least one package relative to a wall surface and relative to the longitudinal axis of at least one other package to reduce frictional engagement between said packages and facilitate travel of the packages toward said exit opening.

11. An anti-bridging system for packages in a vending machine storage compartment, the system comprising:

(a) a first compartment wall;

(b) a second compartment wall having an upper portion, generally parallel with the first compartment wall, and a lower portion inclined relative to said first compartment wall; said lower wall portion cooperating with said first compartment wall to define a progressively narrowing compartment exit; and (c) tilting means including a relatively narrow clip detachably attachable to said lower portion and raised from a surface of said second wall and extending into said upper portion of said second wall to provide a transition portion between said upper and lower wall portions, said clip tilting the longitudinal axis of at least one package traveling down the inclined wall portion relative to the longituding axis of at least another package engaging said one package.

12. A vending machine anti-bridging device as defined in claim 11 in which said clip is snap-connected to said second wall lower portion.

* * * * *